United States Patent [19]

Langere et al.

[11] 4,026,819
[45] May 31, 1977

[54] PRODUCTION OF HYDROUS PENTAVALENT ANTIMONY OXIDE SOL COMPOSITION, DRY POWDER PREPARED THEREFROM, AND PRODUCTION OF SAID DRY POWDER

[75] Inventors: Ronald Francis Langere, Cranbury; Otto Ernest Loeffler, Rahway; Thomas Francis Santini, Cranbury, all of N.J.

[73] Assignee: N L Industries, Inc., New York, N.Y.

[22] Filed: Apr. 9, 1976

[21] Appl. No.: 675,557

[52] U.S. Cl. .............................. 252/313 R; 252/8.1; 252/309; 252/363.5; 423/617
[51] Int. Cl.² ...................... B01J 13/00; B01F 3/12
[58] Field of Search .................... 252/313 R, 363.5; 106/303; 423/617

[56] References Cited

UNITED STATES PATENTS

| 3,281,216 | 10/1966 | Mindick et al. ............. 252/313 S X |
| 3,676,362 | 7/1972 | Yates .............................. 252/8.1 X |
| 3,860,523 | 1/1975 | Petrow et al. ............. 252/313 R X |

*Primary Examiner*—Richard D. Lovering

[57] ABSTRACT

An aqueous antimony pentoxide sol composition, comprising from 10% to 50% antimony pentoxide and the remainder water has been prepared. This sol composition also may contain up to 5.0% of an amine if desired. When this sol composition contains the amine, a dried composition may be obtained from this sol composition. This dried powder contains from 85% to 95% antimony pentoxide and from 2.5% to 10% of an amine, the remainder being absorbed and combined water. This dried composition when added to water or an organic solvent readily forms the stabilized sol composition originally obtained.

4 Claims, No Drawings

PRODUCTION OF HYDROUS PENTAVALENT ANTIMONY OXIDE SOL COMPOSITION, DRY POWDER PREPARED THEREFROM, AND PRODUCTION OF SAID DRY POWDER

BACKGROUND OF THE INVENTION

Antimony oxide products have been used for many years in plastics and textiles to increase the flame resistance properties of the treated material. Antimony oxide pigments have been added with only limited success because the well-known antimony oxide pigment particles are too large e.g. (0.5–3 microns) to obtain maximum effect. Antimony pentoxide has been hydrolyzed in situ onto the material to be treated but these treatments have resulted in only limited success.

A method for preparing an antimony trioxide sol is described in U.S. Pat. No. 3,676,362 in which an antimony trichloride is dissolved in an organic solution, treated with $NH_4OH$ to produce $NH_4Cl$ and antimony trioxide. The $NH_4Cl$ is removed and the antimony trioxide is present as a sol in the solution. The prior art also teaches that an antimony pentoxide sol is more effective than trivalent antimony oxide when added as a flame retardant agent.

One prior art method of preparing the antimony pentoxide sol is described in U.S. Pat. No. 3,860,523. In this procedure a solution of potassium antimonate (containing 2% by weight of antimony calculated as $Sb_2O_5$) is passed through a hydrogen form cation exchange resin whereby the potassium ions are exchanged for hydrogen ions to yield a pentavalent antimony oxide sol. In practice, however, it has been found that the low concentration of antimony pentoxide obtained by this process requires an additional evaporation step to obtain a sufficiently high concentration of antimony to be of real commercial value. This separate evaporation step adds to the cost of the operation which is undesirable.

Other prior art methods are described which show that antimony pentoxide may be formed from antimony trioxide by treating the antimony trioxide with HCl to form antimony trichloride which in turn is oxidized to antimony pentoxide by reacting the antimony trichloride with hydrogen peroxide and subsequently hydrolyzing the antimony values to form hydrates of antimony pentoxide. The prior art attempts to prepare sols of these hydrates have failed, however, in producing stable sols having concentrations above 10% solids. Again the evaporation costs to produce higher concentrations are undesirable.

The instant invention covers the preparation of an antimony pentoxide sol composition which is stable upon standing and possesses a concentration of antimony pentoxide from 10% and up to 50%. This process, in contrast to the prior art, oxidizes antimony trioxide to antimony pentoxide by direct reaction of the trioxide with $H_2O_2$ without the need for solubilizing the trioxide values.

This type of sol is particularly useful as a commercial product in plastics and textiles for improving the flame retardant properties since the sol product does not have to be concentrated before use.

SUMMARY OF THE INVENTION

An antimony pentoxide sol composition stable in aqueous media has been prepared. The aqueous sol composition contains from 10% to 50% antimony pentoxide and the remainder is water. This sol also may contain up to 5.0% of an amine if desired. When the amine is present, the sol may be dried and redispersed in water or an organic solvent depending upon the amine additive to obtain again the sol composition. The dried powder contains from 85% to 95% antimony pentoxide and from 2.5% to 10% of an amine, the remainder being absorbed or combined water.

DESCRIPTION OF THE PREFERRED EMBODIMENTS

The stable sol composition of the instant invention is prepared as follows:

A slurry was prepared by admixing with agitation 1 part of antimony trioxide, from 0.7 to 9.4 parts of water and from 0.65 to 0.68 parts of hydrogen peroxide (35% $H_2O_2$), all of the parts are expressed on a weight basis.

This slurry was then refluxed over a period of from 1 to 10 hours and then cooled to 40°–50° C. during which a stable colloidal solution was formed.

This colloidal solution was then further stabilized by adding from 0.02 to 0.15 part of an amine for each part of the antimony trioxide originally added. The stabilized sol was then stirred for ½ to 2 hours. The stabilized sol obtained contained from 10 to 50% antimony pentoxide, from 0.25% to 5.0% of the amine and the remainder water.

This sol may be stored and subsequently used as is or this sol may be dried to form a powder. The dried powder contained from 85 to 95% antimony pentoxide and from 2.5% to 10% of the amine, the remainder absorbed or combined water.

The dried powder readily disperses in water or organic solvents depending upon the amine additive to form again the stable sol of this invention.

With respect to the amines which may be employed, among those which are most satisfactory includes secondary or tertiary aliphatic amines, having from 1 to 5 carbon atoms, and cyclicamines, such as morpholine and the like.

In order to describe more fully the instant invention, the following examples are presented:

EXAMPLE 1

In this example an antimony pentoxide sol was prepared without adding any stabilizing additives.

200 g. of water were charged into a reactor equipped with a reflux condenser. This water was heated to reflux temperature. Into another tank were added 146 g. antimony trioxide, 97 g. of 35% hydrogen peroxide and 96 g. of water. This mixture was stirred at room temperature to produce a well dispersed antimony oxide slurry.

The antimony oxide slurry was then added slowly to the refluxing water with stirring over a period of 2¼ hours. After all of the antimony oxide slurry was added, the stirring and refluxing were continued for 2¾ hours. After refluxing, the mixture was allowed to cool to 50° C.

The sol obtained was stable upon standing and it possessed the following properties:
$Sb_2O_5$ (%); 30.0
Bulk (lbs./gal.); 11.0
pH, 1.8
Visc. (cps); 10
Particle Size Avg. (A); 250

The pH of this sol may be adjusted from pH of 2 to 10 without detrimentally affecting the stability of the sol.

This sol was used in a typical pad-on for a textile containing 50% cotton and 50% polyester blend. This application to the fabric imparted superior flame retardant properties to the textile material.

EXAMPLE 1a

This example utilizes the sol prepared in Example 1 in which an organic amine is employed to further increase the stability of the sol.

5.7 g. of morpholine were added to the sol over a period of 5 minutes. The mixture was then stirred for 1 hour. The sol produced contained 1% of the amine and the pH was raised to 4.5.

These aqueous sols are commercial products which may be used in these forms to treat various textiles, such as canvas goods, polyester cotton blends, nylon, and the like. This particular sol was used to treat the textile described in Example 1 and again superior flame retardant properties were obtained.

Using the stabilized sol containing the amine, another product was prepared as a dry powder by spray drying the sol at 60° C. The spray dried product had the following properties:
$Sb_2O_5$ %; 91.5
Amine Additive %; 3.5
Density g/cc; 4.14
Visc. (cps); 12 (dispersed)
Particle Size Avg. A; 250 (dispersed)

This spray dried powder possesses the ability to reform the aqueous sol by mixing the powder thoroughly with water. The reformed sol possessed the same properties as the sol before drying. This reformed sol was also as effective as a flame retardant agent as the sol before drying. The sol also remains stable over a pH range from 2 to 10.

The reformed sol may contain from 10% to 75% antimony pentoxide, from 0.25% to 7.5% of an amine and the remainder water.

EXAMPLE 2

In this example 66 g. of water were charged into a reactor equipped with a reflux condenser and stirrer. The water was heated to reflux temperature. 145.8 g. of antimony trioxide, 96 g. of water and 97.2 g. of 35% hydrogen peroxide were charged to a container and stirred at room temperature to produce a well dispersed antimony oxide slurry.

The antimony oxide slurry was then added to the refluxing water over a period of 1½ hours. The colloidal mixture was stirred at reflux for 3½ hours during such time 81 g. of condensate was removed. The aqueous colloid was allowed to cool to room temperature. The sol had the following properties:
$Sb_2O_5$ %; 50
pH; 1.8
Viscosity (cps), 248

EXAMPLES 3–6

In these examples the procedure of Example 1a was repeated except that the amines were varied. The operational details and results obtained are recorded in the Table along with those of Examples 1, 1a and 2.

Although the powder may be dispersed in many organic solvents, it has been found that the following organic solvents are particularly desirable to use when employed in the fiber industry. These solvents include among others dimethyl acetamide, acetone, methylene chloride, ethylene glycol, dimethyl sulfoxide and the like.

From the above description and by the examples presented, it has clearly been shown that antimony pentoxide sols having concentrations from 10% to 50% $Sb_2O_5$ have been prepared. These sols may be produced without having present any stabilizing additives.

If desired, amines may be added in an amount up to 5.0% to further enhance the stability of the sol. In addition, when these sols containing the additives are dried, the powder produced contains from 85% to 95% antimony pentoxide and from 2.5% to 10% of an amine. The powder, however, may be redispersed in aqueous and non-aqueous solvents, depending upon the amine added, and the sol obtained is the same as the stabilized sol formed before drying.

While this invention has been described and illustrated by the examples shown, it is not intended to be strictly limited thereto, and other variations and modifications may be employed within the scope of the following claims.

TABLE

| Ingredients Employed | Examples | | | | | | |
|---|---|---|---|---|---|---|---|
| | 1 | 1a | 2 | 3 | 4 | 5 | 6 |
| Total Water (g.) | 296 | — | 162 | 296 | 296 | 296 | 296 |
| Antimony Trioxide (g.) | 146 | — | 146 | 146 | 146 | 146 | 146 |
| 35% Hydrogen Peroxide (g.) | 97 | — | 97 | 97 | 97 | 97 | 97 |
| Time of Addition (hrs.) | 2-¼ | — | 1-½ | 2-¼ | 2-¼ | 2-¼ | 2-¼ |
| Time of Refluxing (hrs.) | 2-¾ | — | 3-½ | 2-¾ | 2-¾ | 2-¾ | 2-¾ |
| Type of Amine Added | None | Morpholine | None | Triethanol Amine | Tributyl Amine | Triamyl Amine | Tripropyl Amine |
| Amount of Amine (g.) | None | 5.7 | (Removed 81 g. Condensate) | 5.7 | 5.7 | 9.3 | 5.7 |
| Properties of Sol Obtained | | | | | | | |
| Antimony Pentoxide % | 30 | 30 | 50 | 30 | 30 | 32.7 | 30 |
| Amine % | 0 | 1 | 0 | 1 | 1 | 1.6 | 1 |
| pH | 1.8 | 4.5 | 1.8 | 4.5 | 4.8 | — | 4.5 |
| Visc. (cps) | 10 | 10 | 248 | — | 9 | — | 10 |

We claim:

1. A process for producing a stable aqueous antimony pentoxide sol comprising from 10% to 50% antimony pentoxide and the remainder water, said sol prepared by admixing antimony trioxide, hydrogen peroxide and water in amounts such that there are from 0.7 to 9.4 parts of water and from 0.65 to 0.68 parts of hydrogen peroxide for each part of antimony trioxide present in said mixture and refluxing the mixture for a period of 1 to 10 hours then cooling the mixture, thus forming the stable antimony pentoxide sol, all of the percentages and parts expressed on a weight basis.

2. Process for producing a stable aqueous antimony pentoxide sol comprising from 10% to 50% antimony pentoxide, an amine in amount up to 5.0% and the remainder water, said sol prepared by admixing antimony trioxide, hydrogen peroxide and water in amounts such that there are from 0.7 to 9.4 parts of water and from 0.65 to 0.68 parts of hydrogen peroxide for each part of antimony trioxide present in said mixture and refluxing the mixture for a period of 1 to 10 hours then cooling the mixture, and to the mixture adding an amine in amount up to 5.0%, all of the percentages and parts expressed on a weight basis, said amine being selected from the group consisting of secondary and tertiary aliphatic amines having from 1 to 5 carbon atoms and cyclicamines, said sol capable of remaining stable upon drying.

3. A dry powder comprising from 85% to 95% antimony pentoxide, from 2.5% to 10% of an amine and the remainder water, said powder prepared by admixing antimony trioxide, hydrogen peroxide and water in amounts such that there are from 0.7 to 9.4 parts of water and from 0.65 to 0.68 parts of hydrogen peroxide for each part of antimony trioxide present in said mixture and refluxing the mixture for a period of 1 to 10 hours, then cooling the mixture and adding an amine to said mixture in amount up to 5.0%, all of the percentages and parts expressed on a weight basis, said amine being selected from the group consisting of secondary and tertiary aliphatic amines having from 1 to 5 carbon atoms and cyclicamines, and drying the mixture to form said powder.

4. Process for producing a dry powder comprising from 85% to 95% antimony pentoxide, from 2.5% to 10% of an amine and the remainder water which comprises admixing antimony trioxide, hydrogen peroxide and water in amounts such that there are from 0.7 to 9.4 parts of water and from 0.65 to 0.68 parts of hydrogen peroxide for each part of antimony trioxide present in said mixture and refluxing the mixture for a period of 1 to 10 hours, then cooling the mixture and adding an amine to said mixture in amount from 2.5% to 10.0%, all of the percentages and parts expressed on a weight basis, said amine being selected from the group consisting of secondary and tertiary aliphatic amines having from 1 to 5 carbon atoms and cyclicamines, and drying the mixture to form said powder.

* * * * *